(12) United States Patent
Shibata

(10) Patent No.: US 7,210,459 B2
(45) Date of Patent: May 1, 2007

(54) COMMON-RAIL FUEL INJECTION SYSTEM

(75) Inventor: Masamichi Shibata, Anjo (JP)

(73) Assignee: Denso Corporation (JP)

( * ) Notice: Subject to any disclaimer, the term of this patent is extended or adjusted under 35 U.S.C. 154(b) by 118 days.

(21) Appl. No.: 11/098,517

(22) Filed: Apr. 5, 2005

(65) Prior Publication Data

US 2005/0235964 A1     Oct. 27, 2005

(30) Foreign Application Priority Data

Apr. 22, 2004   (JP)  .............................. 2004-127135

(51) Int. Cl.
*F02M 69/46* (2006.01)
*F02M 51/00* (2006.01)

(52) U.S. Cl. ...................... 123/456; 123/480

(58) Field of Classification Search ................ 123/456, 123/478, 480, 447
See application file for complete search history.

(56) References Cited

U.S. PATENT DOCUMENTS

| | | | |
|---|---|---|---|
| 6,192,863 B1 * | 2/2001 | Takase | 123/456 |
| 6,250,285 B1 * | 6/2001 | Takase | 123/456 |
| 6,349,702 B1 * | 2/2002 | Nishiyama | 123/456 |
| 6,463,910 B2 * | 10/2002 | Nishiyama | 123/456 |
| 6,557,530 B1 * | 5/2003 | Benson et al. | 123/480 |
| 6,712,045 B1 * | 3/2004 | McCarthy, Jr. | 123/456 |
| 6,971,368 B2 * | 12/2005 | Uchiyama | 123/359 |

FOREIGN PATENT DOCUMENTS

| | | |
|---|---|---|
| DE | 10100412 A1 | 7/2002 |
| DE | 1023256 A1 | 1/2004 |
| EP | 1 022 452 B1 | 10/2003 |
| EP | 1375887 A | 1/2004 |
| WO | WO 03/006809 A | 1/2003 |

OTHER PUBLICATIONS

French Search Report - Sep. 19, 2005.

* cited by examiner

*Primary Examiner*—Thomas Moulis
(74) *Attorney, Agent, or Firm*—Nixon & Vanderhye PC

(57) ABSTRACT

A common-rail fuel injection system includes a common rail, an injector, a control device and a pressure sensor. The common rail stores the high-pressure fuel. The injector injects the fuel stored in the common rail. The control device obtains an injection quantity from the injector in accordance with an operating state so as to control and on-off valve of the injector based on the injection quantity. The common-rail pressure sensor detects a common-rail pressure of the fuel stored in the common rail. The control device includes correction means for, obtaining a pressure drop quantity of the common rail pressure upon establishment of a predetermined learning condition, obtaining a leakage quantity change of the injector, and correcting the injection quantity based on the leakage quantity change.

11 Claims, 8 Drawing Sheets

COMMON-RAIL FUEL INJECTION SYSTEM

CROSS REFERENCE TO RELATED APPLICATIONS

This application is based upon and claims the benefit of priority of Japanese Patent Application No. 2004-127135, filed on Apr. 22, 2004, the contents of which are incorporated herein by reference.

FIELD OF THE INVENTION

The present invention relates to a common-rail fuel injection system including such an injector that leaks a part of a high-pressure fuel supplied to the injector to a low-pressure side.

BACKGROUND OF THE INVENTION

A common-rail fuel injection system that leaks a part of a high-pressure fuel supplied to an injector to a low-pressure side is known as a type of common-rail fuel injection system.

Since a leakage quantity to the low-pressure side in the injector affects a pressure of the high-pressure fuel supplied to the injector, it consequently constitutes a factor of varying an actual injection quantity from the injector.

The injector is fabricated so that its leakage quantity falls within a predefined range.

As a conventional common-rail fuel injection system, the following common-rail fuel injection system is known. A leakage quantity in an injector is estimated in a control device from a speed of revolution of a supply pump (generally, a speed of revolution of an engine), a temperature of a fuel supplied to the injector, a pressure of a common rail (hereinafter, referred to as a common-rail pressure) and the like. An injection quantity from the injector is corrected by the control device based on the estimated leakage quantity (for example, see Japanese Patent Laid-Open Publications Nos. 2000-18068 and 2000-257478).

(Drawbacks in the Conventional Techniques)

In the conventional techniques, the leakage quantity is estimated from an operating state (the speed of revolution of the supply pump, the fuel temperature, the common-rail pressure, and the like) while a basic leakage quantity of the injector itself is being kept constant. Therefore, a fluctuation in the basic leakage quantity caused by the change of the injector with elapse of time, for example, injector wear and the like has not been taken into consideration. Specifically, the conventional common-rail fuel injection systems do not have any means of detecting a fluctuation in the basic leakage quantity caused by the change of the injector with elapse of time.

As described above, the conventional common-rail fuel injection systems do not have any means of detecting a fluctuation in the basic leakage quantity generated by the change of the injector with elapse of time. Therefore, when the basic leakage quantity of the injector itself increases as indicated with a solid line A in FIG. 3 due to the change of the injector such as wear of a sliding part or a closed part with elapse of time, a fuel pressure applied to a nozzle of the injector decreases. As a result, as indicated with a solid line B in FIG. 3, even if an injection quantity directed by the control device is constant, an actual injection quantity from the injector decreases with the increase in the basic leakage quantity.

Moreover, since the conventional common-rail fuel injection systems do not have means of detecting a fluctuation in the basic leakage quantity generated by the change of the injector with elapse of time, abnormality cannot be detected even when the basic leakage quantity excessively increases.

On the other hand, the injector is fabricated so that the leakage quantity falls within a predefined range as described above. In other words, the leakage quantity varies between injectors within a defined range.

Therefore, in addition to a variation in leakage quantity between injectors, variations between devices such as a variation in other injector elements between injectors, a variation between supply pumps and a variation between pipes are offset by the combination of assembled elements (components and the like). Furthermore, a variation between devices is corrected by the control device so as to obtain specified injection.

As described above, various variations between devices are offset by the combination of assembled elements. Furthermore, the correction is performed so as to obtain specified injection. Therefore, the conventional common-rail fuel injection systems do not have a function of automatically correcting the injection quantity from a median difference in leakage quantity between injectors (a design target value) and a variation in leakage quantity between injectors.

SUMMARY OF THE INVENTION

The present invention was devised in view of the above situation and has an object of providing a common-rail fuel injection system for detecting a leakage quantity in an injector and correcting an injection quantity from the injector in accordance with the leakage quantity so that an actual injection quantity from the injector is made equal to a target injection quantity.

A common-rail fuel injection system according to one aspect of the present invention includes a pressure drop quantity in a common rail pressure detected by a common-rail pressure sensor for each unit time upon the establishment of a predetermined learning condition so as to obtain a leakage quantity change in the injector from the pressure drop quantity. Then, the common-rail fuel injection system corrects an injection quantity from the injector based on the leakage quantity change for each injection.

By correcting the injection quantity from the injector based on the leakage quantity in this manner, the injection quantity from the injector can be properly kept.

A common-rail fuel injection system according to another aspect of the present invention obtains the leakage quantity in the injector from the pressure drop quantity so as to obtain the leakage quantity change from a difference between the leakage quantity and a basic leakage quantity.

The basic leakage quantity in the common-rail fuel injection system according to one aspect of the present invention corresponds to an initial leakage quantity obtained at the first establishment of the predetermined learning condition after the common-rail fuel injection system is assembled to a vehicle.

The initial leakage quantity at the first establishment of the predetermined learning condition is used as the basic leakage quantity in this manner, so that the injection quantity from the injector can be corrected in accordance with a change in leakage quantity generated by the change of the injector with elapse of time. Specifically, even if the leakage quantity in the injector varies with elapse of time, the injection quantity from the injector can be properly kept.

The basic leakage quantity in a common-rail fuel injection system according to another aspect of the present invention corresponds to a median difference between injectors when the injector is new.

The median difference between injectors when the injector is new is used as the basic leakage quantity in this manner, so that the injection quantity can be automatically corrected from a difference between the median difference in leakage quantity between injectors and a variation in leakage quantity between injectors.

The basic leakage quantity in a common-rail fuel injection system according to yet another aspect of the present invention corresponds to a previous leakage quantity obtained at the previous establishment of the predetermined learning condition.

The previous leakage quantity is used as the basic leakage quantity in this manner, so that learning control for adding the current correction value to the previous correction value can be conducted.

The predetermined learning condition of the common-rail fuel injection system according to an aspect of the present in invention is a state where an engine to which the common-rail fuel injection system is assembled is in an operating state, fuel supply to the common rail is stopped, and the injector does not inject any fuel.

A common-rail fuel injection system according to another aspect of the present invention individually obtains a leakage quantity change for each of a plurality of injectors provided for the engine so as to individually correct the injection quantity from each of the injectors based on the leakage quantity change individually obtained for each of the injectors.

As a result, the injection quantity from each of the injectors can be properly kept.

A common-rail fuel injection system according to yet another aspect of the present invention obtains a dynamic leakage quantity for each of the injectors to obtain a leakage quantity change from a difference between the dynamic leakage quantity for each of the injectors and an initial dynamic leakage quantity from each of the injectors so as to individually correct the injection quantity from each of the injectors based on the leakage quantity change individually obtained for each of the injectors.

The injection quantity from each of the injectors is corrected based on the leakage quantity change in its own dynamic leakage, so that the injection quantity from each of the injectors can be properly kept.

A common-rail fuel injection system according to yet another aspect of the present invention obtains a dynamic leakage quantity in a specific injector of the injectors from a difference between a non-idling pressure drop quantity detected by the common-rail pressure sensor without idling and a single-cylinder additional pressure drop quantity detected by the common-rail pressure sensor while only a specific injector is idled.

A common-rail fuel injection system according to yet another aspect of the present invention obtains a dynamic leakage quantity in a specific injector of the injectors from a difference between an all-idling pressure drop quantity detected by the common-rail pressure sensor while all the injectors are idled and a single-cylinder subtractive pressure drop quantity detected by the common-rail pressure sensor while only a specific injector is not idled and the other injections are idled.

A common-rail fuel injection system according to still another aspect of the present invention determines abnormality of the injector when the leakage quantity change exceeds a preset criterion threshold value.

An excessive increase in leakage quantity in the injector due to change with elapse of time can be detected in this manner. Specifically, leakage abnormality in the injector can be detected so as to prevent problems (insufficient output, poor drivability and the like) from occurring due to leakage abnormality in the injector.

A common-rail fuel injection system according to still another aspect of the present invention obtains a pressure drop quantity in the common-rail pressure detected by the common-rail pressure sensor per unit time at the establishment of the predetermined learning condition so as to obtain a pressure-reduction rate change from the pressure drop quantity. Then, the injection quantity from the injector is corrected based on the pressure-reduction rate change for each injection.

The injection quantity from the injector is corrected based on the pressure-reduction rate change in this manner, so that the injection quantity from the injector can be properly kept.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Figure 1:
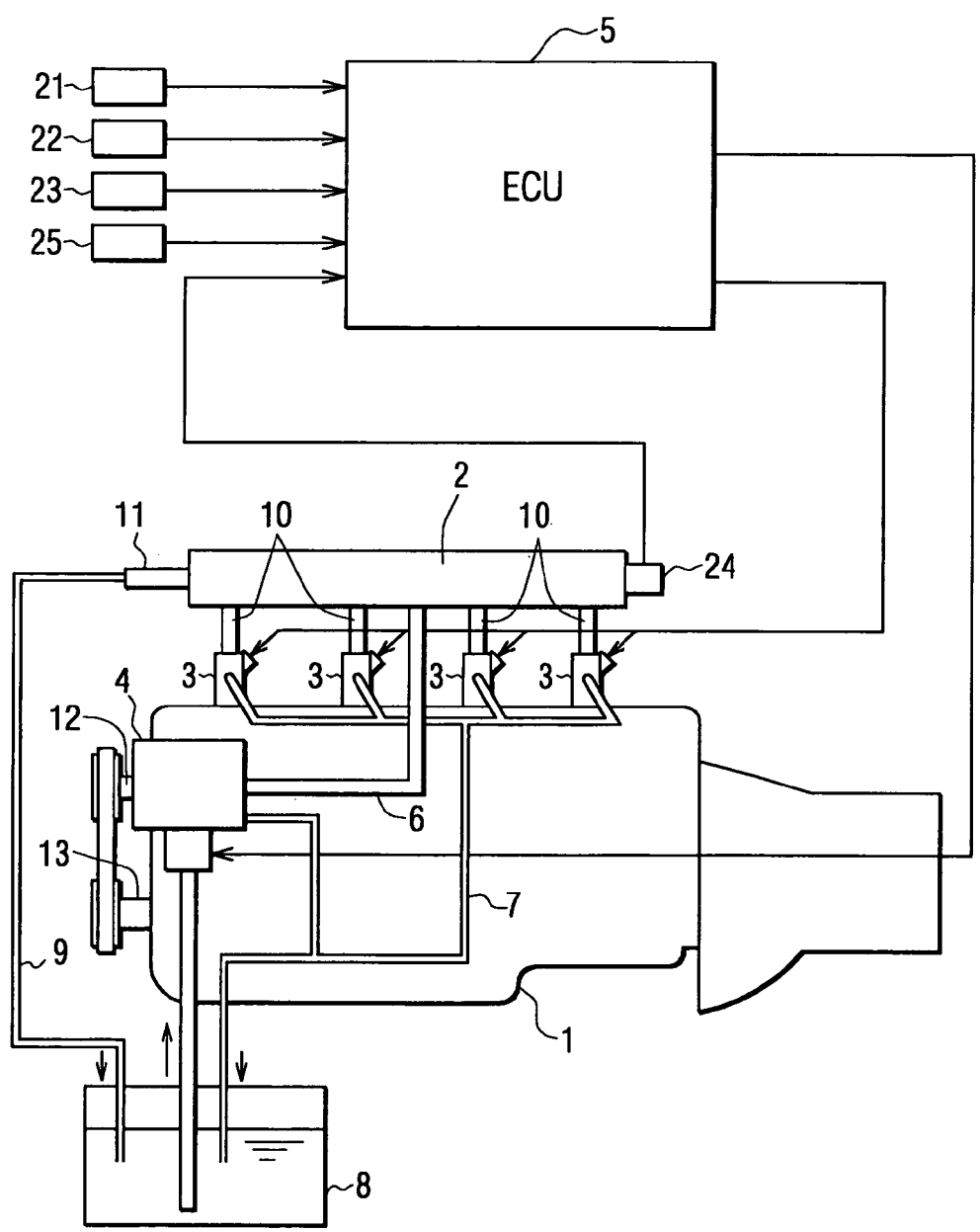
FIG. 1 is a schematic diagram of a common-rail fuel injection system according to an embodiment of the present invention.

A common-rail fuel injection system according to a first preferred embodiment includes a common rail for storing a high-pressure fuel therein, an injector for injecting the fuel stored in the common rail, and a control device for obtaining an injection quantity from the injector in accordance with an operating state and for controlling an on-off valve of the injector based on the injection quantity, thereby leaking a part of the high-pressure fuel supplied to the injector to the low-pressure side.

The common-rail fuel injection system also includes a common-rail pressure sensor for detecting a common-rail pressure of the fuel stored in the common rail.

The control device obtains a pressure drop quantity in the common-rail pressure detected by the common-rail pressure sensor per unit time at the establishment of a predetermined learning condition so as to obtain a leakage quantity change in the injector from the pressure drop quantity. Then, the injection quantity from the injector is corrected for each injection based on the leakage quantity change.

A control device of the common-rail fuel injection system according to a second preferred embodiment obtains a pressure drop quantity in the common rail pressure detected by the common-rail pressure sensor per unit time at the establishment of a predetermined learning condition so as to obtain a pressure-reduction rate change from the pressure drop quantity. Then, the injection quantity from the injector is corrected based on the pressure-reduction rate change for each injection.

Embodiment 1 where the present invention is applied to a common-rail fuel injection system will be described with reference to FIGS. 1 to 9.

A structure of a common-rail fuel injection system will be described with reference to FIG. 1.

The common-rail fuel injection system is a system for injecting a fuel into, for example, a diesel engine (hereinafter, simply referred to as an engine) 1. The common-rail fuel injection system is constituted by a common rail 2, injectors 3, a supply pump 4, an ECU 5 (an abbreviation of Engine Control Unit; corresponding to a control device) and the like.

The engine 1 includes a plurality of cylinders for continuously performing the steps of suction, compression, ignition, and exhaustion. Although FIG. 1 shows a four-cylinder engine as an example, the engine may include a different number of cylinders.

The common rail 2 is an accumulator for accumulating a high-pressure fuel supplied to the injectors 3. The common rail 2 is connected to an exhaust port of the supply pump 4 for force-feeding the high-pressure fuel through a fuel pipe (a high-pressure fuel passage) 6 so that a common-rail pressure (a fuel supply pressure to the injectors 3) Pc pressurized to achieve a high pressure is accumulated.

A fuel leaked from the injectors 3 is returned through a leakage pipe (a fuel return passage) 7 to a fuel tank 8.

A pressure limiter 11 is attached to a relief pipe (a fuel return passage) 9 from the common rail 2 to the fuel tank 8. The pressure limiter 11 is a pressure safety valve that opens when a fuel pressure in the common rail 2 exceeds a set limit pressure so as to keep the fuel pressure in the common rail 2 to or under the set limit pressure.

The injector 3 is provided for each of the cylinders of the engine 1 so as to inject and supply the fuel into each of the cylinders. The injectors 3 are connected to downstream ends of a plurality of high-pressure fuel pipes 10 branching from the common rail 2 so as to inject and supply the high-pressure fuel accumulated in the common rail 2 into the respective cylinders. The details of the injector 3 will be described below.

The supply pump 4 is a fuel pump for force-feeding the high-pressure fuel to the common rail 2. The supply pump 4 includes a feed pump for sucking the fuel in the fuel tank 8 into the supply pump 4 and a high-pressure pump for compressing the fuel sucked by the feed pump at a high pressure so as to force-feed the fuel to the common rail 2. The feed pump and the high-pressure pump are driven by a cam shaft 12. The cam shaft 12 is rotationally driven by a crank shaft 13 of the engine 1 or the like as shown in FIG. 1.

The supply pump 4 also includes a pump control valve (SCV: not shown) for regulating the amount of fuel sucked into the high-pressure pump. The pump control valve is regulated by the ECU 5 so as to regulate the common-rail pressure PC.

The ECU 5 includes a microcomputer having a known structure. The microcomputer includes a CPU for performing control processing and computing processing, a storage device for storing various programs and data (a memory such as a ROM, a standby RAM or an EEPROM, or a RAM), an input circuit, an output circuit, a power supply circuit, an injector driver circuit, a pump driver circuit, and the like. The ECU 5 performs various computing processes based on signald from sensors (an engine parameter; a signal in accordance with an operating state of a vehicle, an operating state of the engine 1 and the like) read in the ECU 5. The driver circuits such as the injector driver circuit and the pump driver circuit may be provided separately from the ECU 5 as an EDU (electronic drive unit).

As the sensors connected to the ECU 5, as shown in FIG. 1, there are an accelerator sensor 21 for detecting the degree of acceleration, a revolution number sensor 22 for detecting the number of revolutions of the engine 1, a water temperature sensor 23 for detecting a temperature of a cooling water for the engine 1, a common-rail pressure sensor 24 for detecting the common-rail pressure PC, and other sensors 25.

The ECU 5 obtains a required injection quantity Q and required injection timing T of the injector in accordance with a current operating state based on the program (a map and the like) stored in the ROM and the engine parameter read in the RAM. The ECU 5 starts the fuel injection from the injectors 3 at the required injection timing T while generating an injection pulse (a signal for controlling the driving of an electromagnetic valve of the injector so as to control the timing of opening and closing the valve of the injector) for allowing the required injection quantity Q to be injected from the injectors 3.

(Description of the Injector 3)

Figure 2:
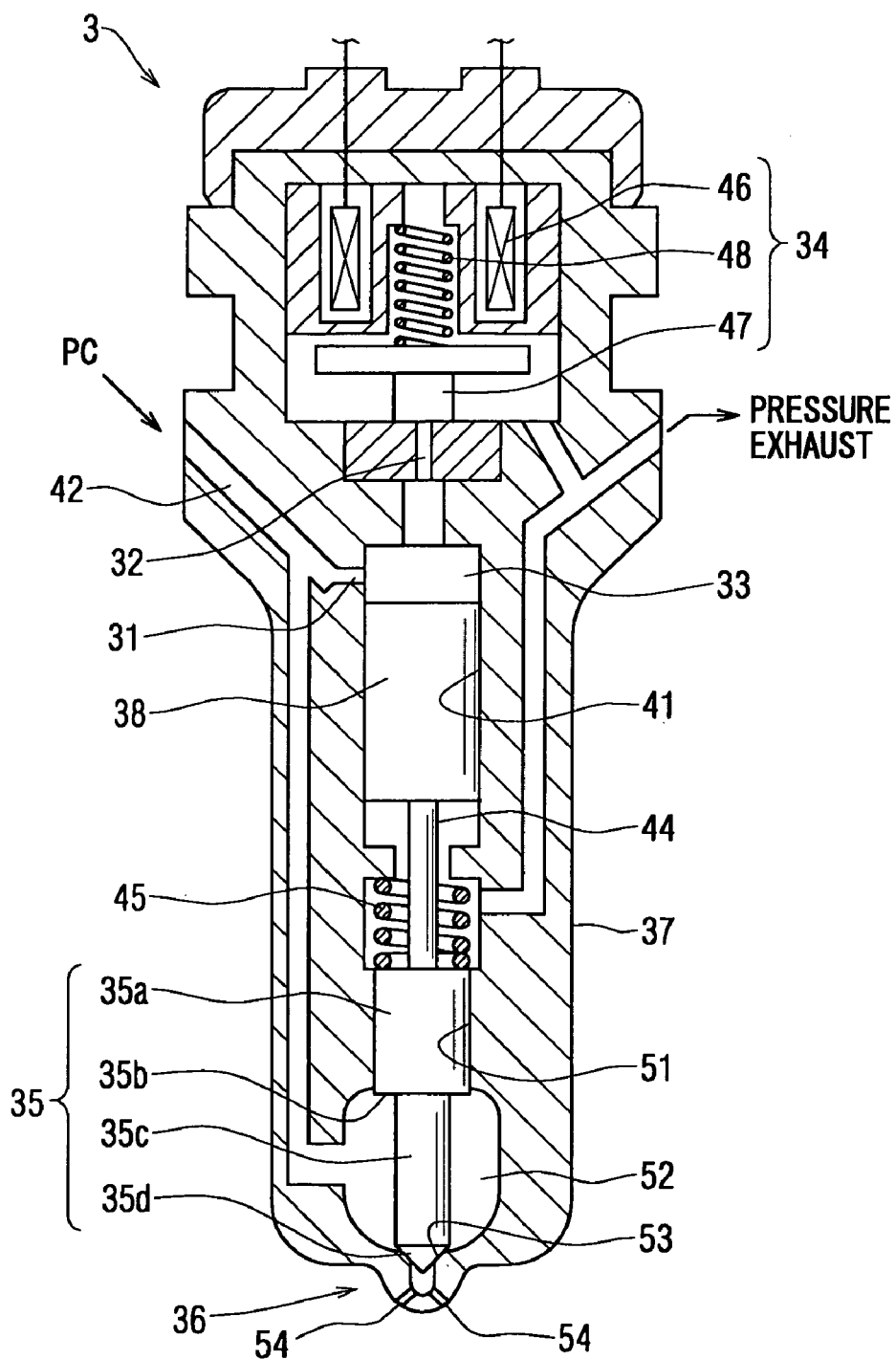
FIG. 2 is a cross-sectional side view of an injector of the fuel injection system of FIG. 1.

Next, a basic structure of the injector 3 will be described with reference to FIG. 2.

The injector 3 is used for injecting the high-pressure fuel supplied from the common rail 2 into the cylinder of the engine 1. The injector 3 includes a control chamber 33. The common-rail pressure PC is applied to the control chamber 33 through an inlet passage 31 (a fuel passage in which an in-orifice is provided). At the same time, the pressure in the control chamber 33 is exhausted through an exhaust passage 32 (a fuel passage in which an out-orifice is provided). The injector 3 also includes a nozzle 36. When the exhaust passage 32 is opened and closed by the electromagnetic valve 34 (an example of an electrically operable valve), a control chamber pressure (a pressure in the control chamber 33) drops to an opening valve pressure. Then, a needle 35 comes up so that the nozzle 36 injects the fuel.

A housing 37 (for example, a nozzle holder) of the injector 3 includes a cylinder 41 slidably supporting a command piston 38 in a vertical direction (in a direction of opening and closing the valve by the needle 35), a high-pressure fuel passage 42 for guiding the high-pressure fuel supplied from the common rail 2 toward the nozzle 36 and the inlet passage 31, a pressure-exhausting fuel passage 43 for exhausting the high-pressure fuel to the low-pressure side and the like.

The command piston 38 is inserted into the cylinder 41 so as to be connected to the needle 35 through a pressure pin 44.

The pressure pin 44 is interposed between the command piston 38 and the needle 35. A spring 45 for biasing the needle 35 downward (in a valve-opening direction) is provided around the pressure pin 44.

The control chamber 33 is formed in an upper part of the cylinder 41 (on the side of the electromagnetic valve 34) and has a volume varying in accordance with the vertical movement of the command piston 38.

The inlet passage 31 is a fuel throttle on the inlet side for reducing the pressure of the high-pressure fuel supplied from the high-pressure fuel passage 42. The high-pressure fuel passage 42 and the control chamber 33 are in communication with each other through the inlet passage 31.

The exhaust passage 32 is formed above the control chamber 33. The exhaust passage 32 is a fuel throttle on the outlet side for reducing the fuel exhausted from the control chamber 33 to the pressure-exhausting fuel passage 42 (the low-pressure side). The control chamber 33 and the pressure-exhausting fuel passage 43 are in communication with each other through the exhaust passage 32.

The electromagnetic valve 34 includes a solenoid 46, a valve 47, and a return spring 48. When the solenoid 46 is electrically charged (turned ON), it generates an electromagnetic force. The valve 47 is attracted upward (in the valve-opening direction) by the electromagnetic force generated by the solenoid 46. The return spring 48 biases the valve 47 downward (in a valve-closing direction).

When the solenoid 46 is in an OFF state, the valve 47 is pushed down by the biasing force of the return spring 48 so that the valve 47 (for example, a ball valve not shown provided at the tip of the valve 47) closes the exhaust passage 32. When the solenoid 46 is in an ON state, the valve 47 moves up against the biasing force of the return spring 48 by the electromagnetic force generated by the solenoid 46 to open the exhaust passage 32.

The housing 37 (for example, a nozzle body) of the injector 3 includes a sliding hole 51 for supporting the needle 35 slidably in the vertical direction (in the opening and closing direction), a nozzle chamber 52 provided in an annular form around the outer circumference of the needle 35, a conical valve seat 53 on which the needle 35 rests when the valve is opened, and a plurality of nozzle holes 54 for injecting the high-pressure fuel. The nozzle holes 54 are perforated so as to be situated inside of a seat face of the valve seat 53 on which the needle 35 and the valve seat 53 come into contact with each other. When the needle 53 rests on the valve seat 53, the nozzle holes 54 are closed.

The needle 35 includes a sliding shaft 35$a$ held in the sliding hole 51, a pressure-receiving face 35$b$ formed on a bottom of the sliding shaft 35$a$, a shaft 35$c$ having a smaller diameter that extends downward from the pressure-receiving face 35$b$, and a conical valve 35$d$ for resting on and leaving the valve seat 53 so as to open and close the nozzle holes 54. The sliding shaft 35$b$ is provided to axially reciprocate while sealing a part between the nozzle chamber 52 and the low-pressure side (around the pressure pin 44).

Next, an operation of the injector 3 will be described.

When the ECU 5 applies an injection pulse to the injector driver circuit, the injector driver circuit starts allowing the electromagnetic valve 34 to be electrically conducted. Then, the electromagnetic valve 34 attracts the valve 47 so that the valve 47 starts lifting up. As a result, the exhaust passage 32 opens so that the pressure in the control chamber 33, which has been reduced in the inlet passage 31, starts dropping.

When the pressure in the control chamber 33 is dropped to or below the valve-opening pressure, the needle 35 starts moving up. When the needle 35 leaves the valve seat 53, the nozzle chamber 52 and the nozzle holes 54 are brought into communication with each other. As a result, the high-pressure fuel supplied to the nozzle chamber 52 is injected from the nozzle holes 54.

With the elevation of the needle 35, an injection rate is increased. When the injection rate reaches the maximum injection rate, the injection rate does not increase any more.

When the ECU 5 stops the injection pulse that has been applied to the injector 3, the injector driver circuit stops the electrical conduction of the electromagnetic valve 34. Then, the electromagnetic valve 34 stops attracting the valve 47 so that the valve 47 starts moving down. When the valve 47 of the electronic valve 34 closes the exhaust passage 32, the pressure in the control chamber 33 starts increasing. When the pressure in the control chamber 33 increases to the valve-opening pressure or higher, the needle 35 starts moving down.

When the needle 35 moves down to seat on the valve seat 53, the communication between the nozzle chamber 52 and the nozzle holes 54 is blocked to stop the fuel injection from the injection holes 54.

As described above, the ECU 5 obtains the required injection quantity Q and the required injection timing T in accordance with the current operating state based on the program (the map or the like) stored in the ROM and the engine parameter (the operating state of the vehicle detected by various sensors) read in the RAM for each injection of the fuel. The injection pulse of the injector 3 is generated so that the fuel injection is started from the injector 3 at the required injection timing T whereas the required injection quantity Q is injected from the injector 3.

Herein, the common-rail fuel injection system including the above-described injectors 3 leaks a portion of the high-pressure fuel supplied to the injectors 3 to the low-pressure side.

In the injector 3, the fuel leaked to the low-pressure side consists of a static leakage and a dynamic leakage. The static leakage is generated to the low-pressure side through a sliding part in the injector 3 (a part between the command piston 38 and the cylinder 41 and a part between the sliding shaft 35$a$ of the needle 35 and the sliding hole 51) or a closed part (a part of the exhaust passage 32 closed by the valve 47) when the valve 47 of the electromagnetic valve 34 closes the exhaust passage 32. The dynamic leakage is generated from the exhaust passage 32 to the low-pressure side when the valve 47 of the electromagnetic valve 34 opens the exhaust passage 32. A leakage quantity of the fuel corresponding to the static leakage flowing to the low-pressure side is referred to as a static leakage quantity. A leakage quantity of the fuel corresponding to the dynamic leakage flowing to the low-pressure side is referred to as a dynamic leakage quantity.

Since the leakage quantity (the static leakage quantity and the dynamic leakage quantity) to the low-pressure side in the injector 3 affects the pressure of the high-pressure fuel supplied to the injector 3, it comes to constitute a factor of varying an actual injection quantity injected from the injector 3.

Figure 3:
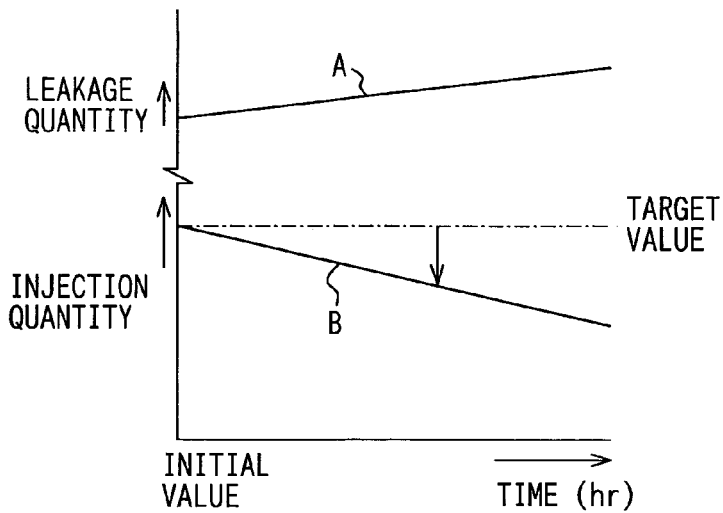
FIG. 3 is a graph showing a relationship between an increase in a leakage quantity and a decrease in an injection quantity of the injector of FIG. 2.

Specifically, when the leakage quantity in the injector 3 increases as indicated with a solid line A in FIG. 3 by wear of each sliding part of the injector 3, the fuel pressure applied to the nozzle 36 of the injector 3 decreases. As a result, as indicated with a solid line B in FIG. 3, even if an injection quantity directed by the ECU 5 is constant, an actual injection quantity actually injected from the injector 3 decreases with the increase in leakage quantity.

Therefore, the ECU 5 in this Embodiment 1 is provided with a function of correction means for correcting the injection quantity from the injector 3 in accordance with a change in leakage quantity generated by the change of the injector 3 with elapse of time.

At the establishment of a predetermined learning condition, the correction means measures a pressure drop quantity ($\Delta PCi/\Delta \tau$) in the common rail pressure detected by the common rail pressure sensor 24 per unit time so as to obtain a leakage quantity change $\Delta q$ generated by the change (deterioration) of the injector 3 with elapse of time from a difference between the measured pressure drop quantity ($\Delta PCi/\Delta \tau$) and an initial pressure drop quantity ($\Delta PC0/\Delta \tau$). The correction means corrects the injection quantity of the fuel injected from the injector 3 (corrects the required injection quantity Q or the injection period) based on the leakage quantity change $\Delta q$ so that the required injection quantity Q calculated in accordance with the current operating state and the actual injection quantity actually injected from the injector 3 become equal to each other.

Specifically, in this example, a leakage quantity change $\Delta qic$ is obtained based on a dynamic leakage quantity qic in each of the injectors 3 so that the injection quantity injected from each of the injectors 3 is corrected based on the leakage quantity change qic in each of the injectors 3.

A predetermined learning condition in this Embodiment 1 corresponds to a state satisfying all the following conditions: a travel distance of the vehicle reaches a predetermined learning distance (or a predetermined learning distance interval), an operating state where the engine is stable (for example, the number of engine revolutions) is equal to or more than a predetermined number, fuel temperature is within a predetermined temperature range), the fuel supply to the common rail 2 is stopped (the force-feeding of the fuel from the supply pump 4 is stopped), and the injector 3 does not inject the fuel (Q<0).

(1) With reference to FIGS. 4A and 4B, an example where a total static leakage quantity and a total dynamic leakage quantity in all the injectors 3 are separately measured will be described.

Figure 4A:
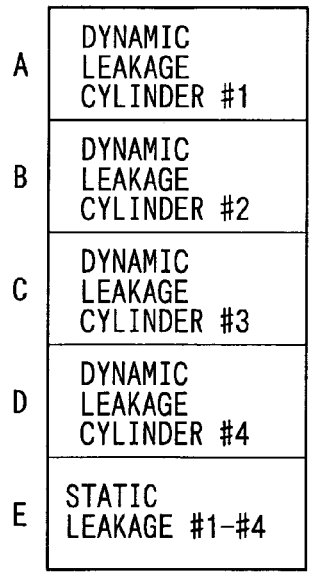
FIGS. 4A and 4B are explanatory charts showing separate measurements of a static leakage quantity and a dynamic leakage quantity according to the present invention.

As shown in FIG. 4A, the description will be given assuming that the dynamic leakage quantity qic in the injector 3 provided for a first cylinder is (A), the dynamic leakage quantity qic in the injector 3 provided for a second cylinder is (B), the dynamic leakage quantity qic in the injector 3 provided for a third cylinder is (C), the dynamic leakage quantity qic in the injector 3 provided for a fourth cylinder is (D), and a total static leakage quantity in all the injectors 3 is (E).

The total leakage quantity in all the injectors 3 is the sum of a total dynamic leakage quantity in all the injectors 3 (A+B+C+D) and the total static leakage quantity (E) in all the injectors 3.

The total static leakage quantity (E) in all the injectors 3 is measured without idling, that is, in the state where the respective electromagnetic valves 34 of all the injectors 3 are not operated. The total static leakage quantity (E) can be obtained from the pressure drop quantity ($\Delta PC/\Delta \tau$) per unit time, which is measured by the common-rail pressure sensor 24 without idling all the injectors 3.

On the other hand, the total leakage quantity (A+B+C+D+E) can be obtained from the pressure drop quantity ($\Delta PC/\Delta \tau$) per unit time, which is measured by the common-rail pressure sensor 24 while all the injectors 3 are continuously idled.

The total static leakage quantity (E) is subtracted from the total leakage quantity (A+B+C+D+E) to obtain the total dynamic leakage quantity (A+B+C+D).

The idling corresponds to electrical conduction control for the electromagnetic valve 34 by the ECU 5 so that the valve 47 starts moving up to open the exhaust passage 32 to generate a dynamic leakage and closes the exhaust passage 32 before the pressure in the control chamber 33 drops to the valve-opening pressure (a pressure at which the needle 35 starts moving up).

Figure 4B:
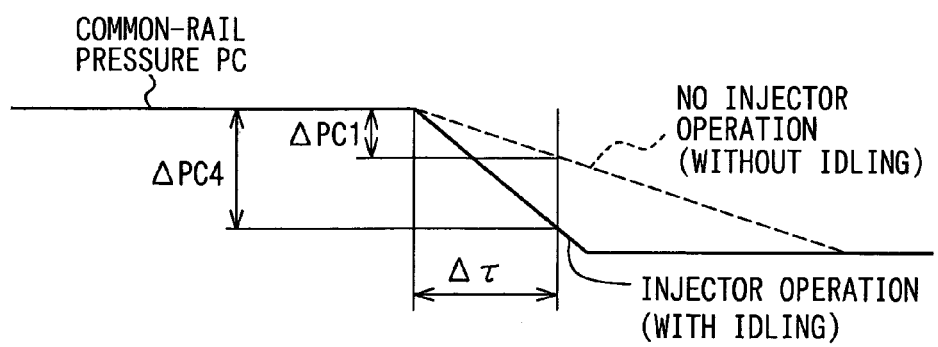

More specifically, at the establishment of a predetermined learning condition during the operation of the engine 1, all the injectors 3 are continuously idled as shown in FIG. 4B so as to measure a pressure drop quantity (hereinafter, referred to as all-idling pressure drop quantity) $\Delta PC4$ for each predetermined period $\Delta \tau$ from a change in the common-rail pressure PC detected by the common-rail pressure sensor 24.

Next, at the establishment of the predetermined learning condition, a pressure drop quantity (hereinafter, referred to as non-idling pressure drop quantity) $\Delta PC1$ for each predetermined period $\Delta \tau$ is measured from the change in the common-rail pressure PC detected by the common-rail pressure sensor 24 without idling all the injectors 3. The total static leakage quantity (E) can be estimated from the non-idling pressure drop quantity $\Delta PC1$ and a map (or an operational expression).

The non-idling pressure drop quantity $\Delta PC1$ is subtracted from the all-idling pressure drop quantity $\Delta PC4$ ($\Delta PC4 - \Delta PC1$). The total dynamic leakage quantity (A+B+C+D) can be estimated from the value obtained by the subtraction and the map (or the operational expression).

Although the all-idling pressure drop quantity $\Delta PC4$ is first measured in this example, the non-idling pressure drop quantity $\Delta PC1$ may be first measured.

(2) With reference to FIG. 5A to FIG. 6B, two examples of measurement of the dynamic leakage quantity qic in the injector 3 for a specific cylinder will be described.

In this example, the dynamic leakage quantity qic in the injector 3 for a specific cylinder is described as a specific dynamic leakage quantity (N). Specifically, the specific dynamic leakage quantity (N) is any one of the dynamic leakage quantity (A) of the injector 3 provided for the first cylinder, the dynamic leakage quantity (B) of the injector 3 provided for the second cylinder, the dynamic leakage quantity (C) of the injector 3 provided for the third cylinder, and the dynamic leakage quantity (D) of the injector 3 provided for the fourth cylinder.

(2-1) A first measurement method will be described.

Figure 5A:
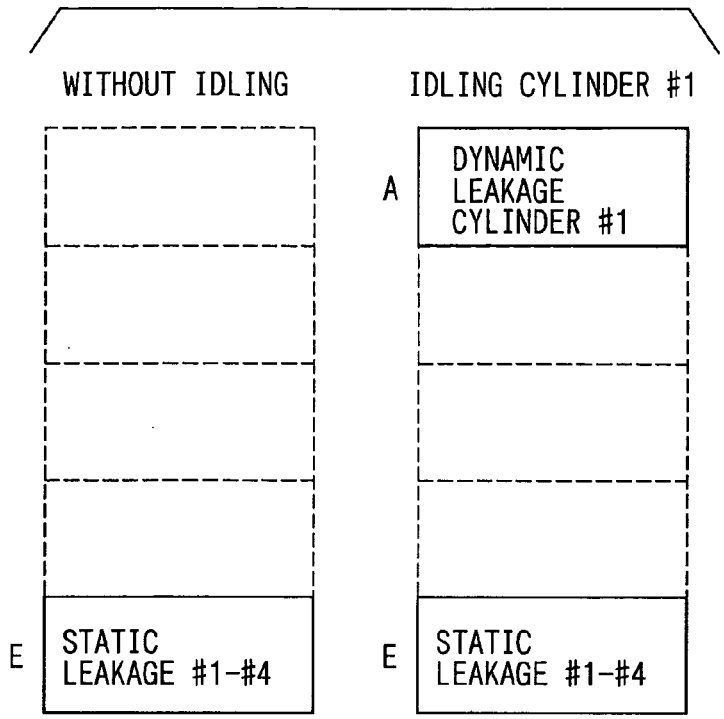
FIGS. 5A and 5B are explanatory charts showing a first measurement method of a dynamic leakage quantity in an injector provided for a specific cylinder of the fuel injection system of the present invention.

A measurement method of the specific dynamic leakage quantity (N) is for measuring the total static leakage quantity (E) without operating the respective electromagnetic valves 34 in all the injectors 3 and a single-cylinder additional leakage quantity (E+N) obtained by adding the total static leakage quantity and the dynamic leakage quantity qic in a specific cylinder while continuously idling only the injector 3 for a specific cylinder as shown in FIG. 5A.

The specific dynamic leakage quantity (N) is measured from a difference between the total static leakage quantity (E) and the single-cylinder additional leakage quantity (E+N).

Figure 5B:
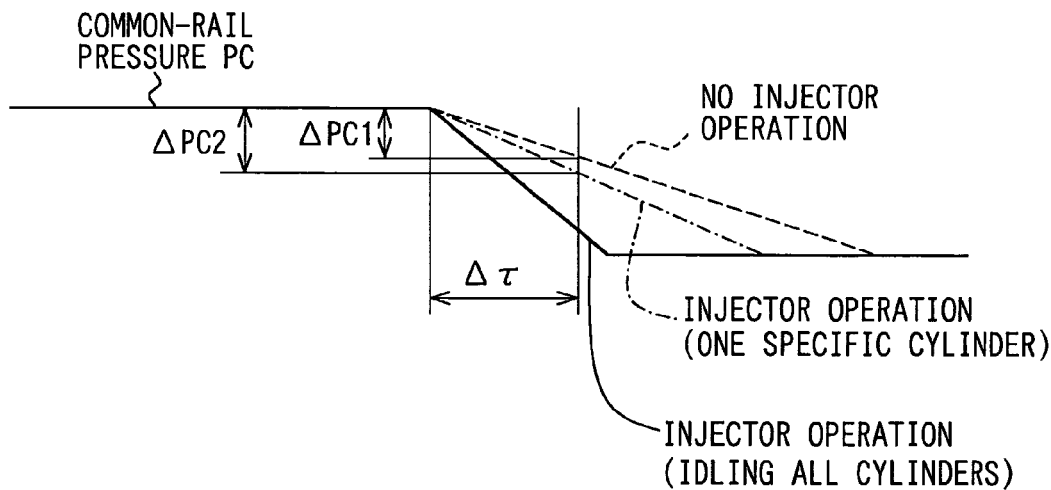

Specifically, when the predetermined learning condition is established while the engine 1 is being in operation, the pressure drop quantity (hereinafter, referred to as the non-idling pressure drop quantity) $\Delta PC1$ in the common-rail pressure PC for each predetermined period $\Delta\tau$ without idling all the injectors 3 is measured as shown in FIG. 5B.

Next, at the establishment of the predetermined learning condition, only the injector 3 for a specific cylinder is continuously idled so as to measure a pressure drop quantity (hereinafter, referred to as a single-cylinder additional pressure drop quantity) $\Delta PC2$ in the common-rail pressure PC for each predetermined period $\Delta\tau$.

A difference between the non-idling pressure drop quantity $\Delta PC1$ and the single-cylinder additional pressure drop quantity $\Delta PC2$ is obtained so that the specific dynamic leakage quantity (N) can be estimated from the obtained difference and the map (or the operational expression).

Although the non-idling pressure drop quantity $\Delta PC1$ is first measured in this example, the single-cylinder additional pressure drop quantity $\Delta PC2$ may be first measured instead.

(2-2) A second measurement method will be described.

Figure 6A:
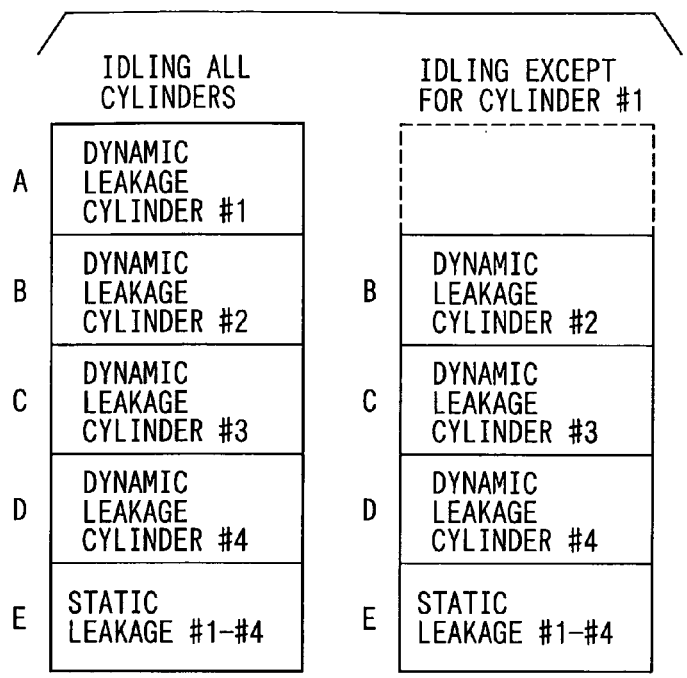
FIGS. 6A and 6B are explanatory charts showing a second measurement method of a dynamic leakage quantity in an injector provided for a specific cylinder of the fuel injection system of the present invention.

In the second measurement method of the dynamic leakage quantity qic of the injector 3 for a specific cylinder, as shown in FIG. 6A, the total leakage quantity (A+B+C+D+E) is measured while continuously idling all the injectors 3. At the same time, only the injector 3 for a specific cylinder is not idled whereas the other injectors 3 are continuously idled so as to measure a single-cylinder subtractive leakage quantity obtained by adding the total static leakage quantity to the dynamic leakage quantity qic for three cylinders (B+C+D+E if only the injector 3 for the first cylinder is not operated).

Then, the specific dynamic leakage quantity (N) is measured from a difference between the total leakage quantity (A+B+C+D+E) and the single-cylinder subtractive leakage quantity (B+C+D+E if only the injector 3 for the first cylinder is not operated).

Figure 6B:
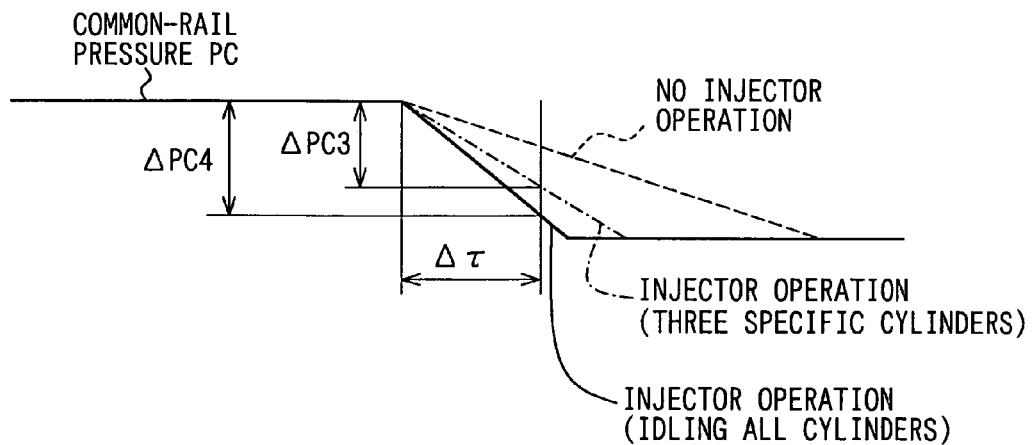

Specifically, when the predetermined learning condition is established while the engine 1 is being in operation, the pressure drop quantity (hereinafter, referred to as the all-idling pressure drop quantity) $\Delta PC4$ in the common-rail pressure PC for each predetermined period $\Delta\tau$ while all the injectors 3 are continuously idled is measured as shown in FIG. 6B.

Next, at the establishment of the predetermined learning condition, only the electromagnetic valve 34 of the injector 3 for the specific cylinder is not operated while all the injectors 3 are continuously idled so as to measure a pressure drop quantity (hereinafter, referred to as a single-cylinder subtractive pressure drop quantity) $\Delta PC3$ in the common-rail pressure PC for each predetermined period $\Delta\tau$.

A difference between the all-idling pressure drop quantity $\Delta PC4$ and the single-cylinder subtractive pressure drop quantity $\Delta PC3$ is obtained so that the specific dynamic leakage quantity (N) can be measured from the obtained difference and the map (or the operational expression).

Although the all-idling pressure drop quantity $\Delta PC4$ is first measured in this example, the single-cylinder subtractive pressure drop quantity $\Delta PC3$ may be first measured instead.

(3) With reference to FIGS. 7A and 7B, a basic principle of obtaining the leakage quantity change $\Delta q$ will be described.

Figure 7A:
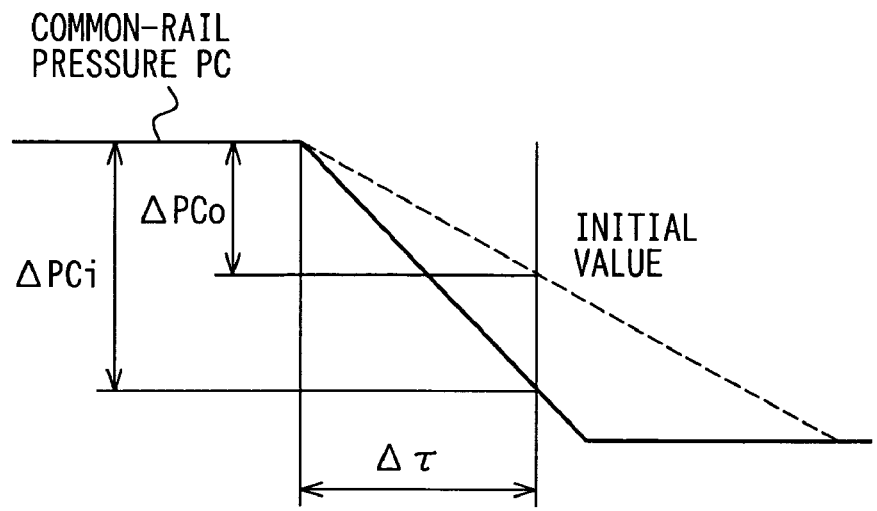
FIGS. 7A and 7B are explanatory charts of a basic principle of obtaining a leakage quantity change of the present invention.
Figure 7B:
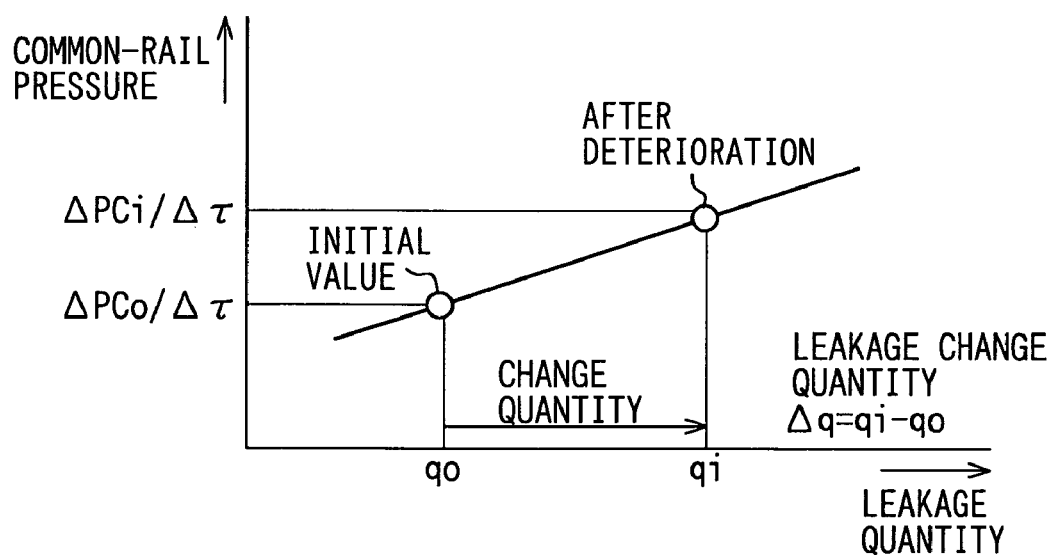

When a first learning condition after the fabrication of a vehicle is established, the drop quantity $\Delta PCi$ in the common-rail pressure PC for each predetermined period $\Delta\tau$ is measured as shown in FIG. 7A. The leakage quantity q is obtained from the drop quantity $\Delta PCi/\Delta\tau$ by using a map, a calculating formula or the like. The obtained value is stored in a memory as an initial leakage quantity q0.

Thereafter, when the predetermined learning condition is established while the engine 1 is operating, an actual drop quantity $\Delta PCi$ in the common-rail pressure PC for the predetermined period $\Delta\tau$ is measured. An actual leakage quantity qi is obtained from the actual drop quantity $\Delta PCi/\Delta\tau$ by using a map, a calculating formula or the like.

A leakage quantity change value $\Delta q$ is estimated from a difference (qi−q0) between the actual leakage quantity qi and the initial leakage quantity q0.

(4) The ECU 5 in this Example individually measures the dynamic leakage quantity qic of each of the injectors 3 by using the technique (2-1) or (2-2) described above. At the same time, the ECU 5 measures the leakage quantity change $\Delta q$ of the injector 3 for each cylinder by using the technique (3) described above. Then, the ECU 5 corrects the injection quantity from each of the injectors 3 based on the obtained leakage quantity change $\Delta q$.

Figure 8:
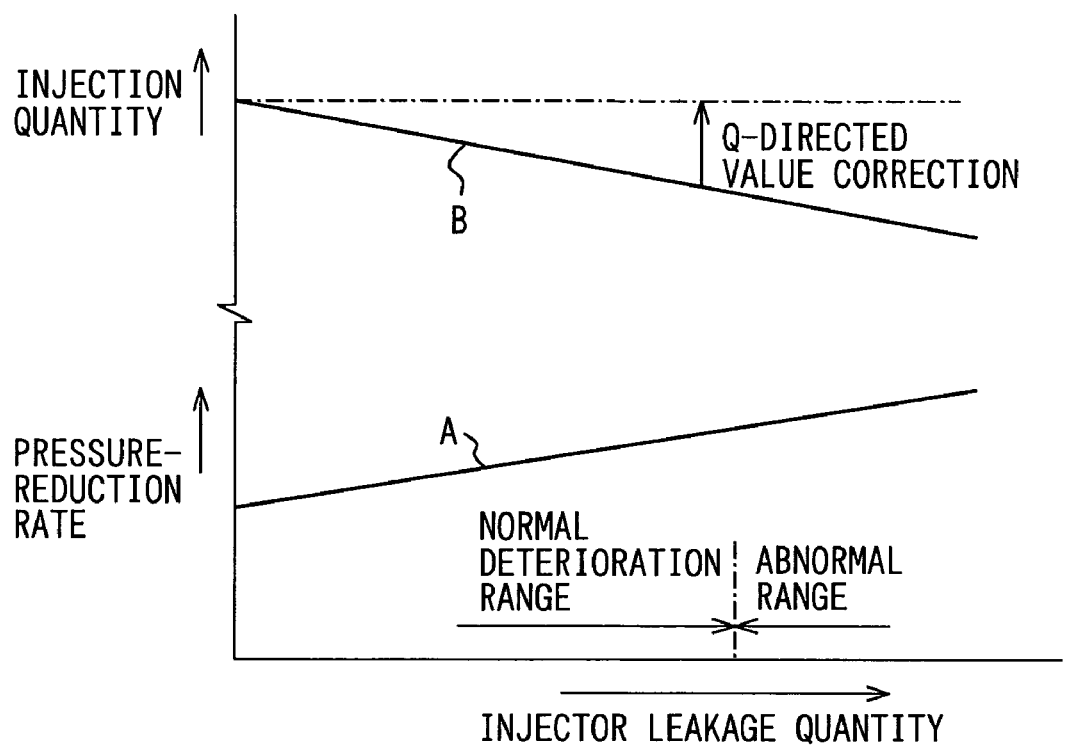
FIG. 8 is an explanatory chart for increasing a corrected value of injection in accordance with pressure-reduction rate of the common-rail pressure of the fuel injection system of the present invention.

Specifically, as indicated with the solid line A in FIG. 8, the leakage quantity increases due to wear of the injector 3 or the like so that a pressure-reduction rate of the common-rail pressure PC (the pressure drop quantity per unit time) is increased as compared with its initial value. Then, the injection quantity from the injector 3 drops as indicated with the solid line B. Therefore, the ECU 5 increases the injection quantity as the pressure-reduction rate of the common-rail pressure PC increases (the leakage quantity change $\Delta q$ increase) as compared with its initial value so as to perform correction to properly keep the inject quantity.

(5) The ECU 5 in this example has a function of determination means for determining the abnormality of the injector 3 having the leakage quantity change $\Delta qic$ exceeding a preset criterion threshold value q' when the leakage quantity change $\Delta qic$ in each of the injectors 3 exceeds the criterion threshold value q' so as to inform a vehicle passenger of the occurrence of abnormality by a display device (not shown) or the like.

Figure 9:
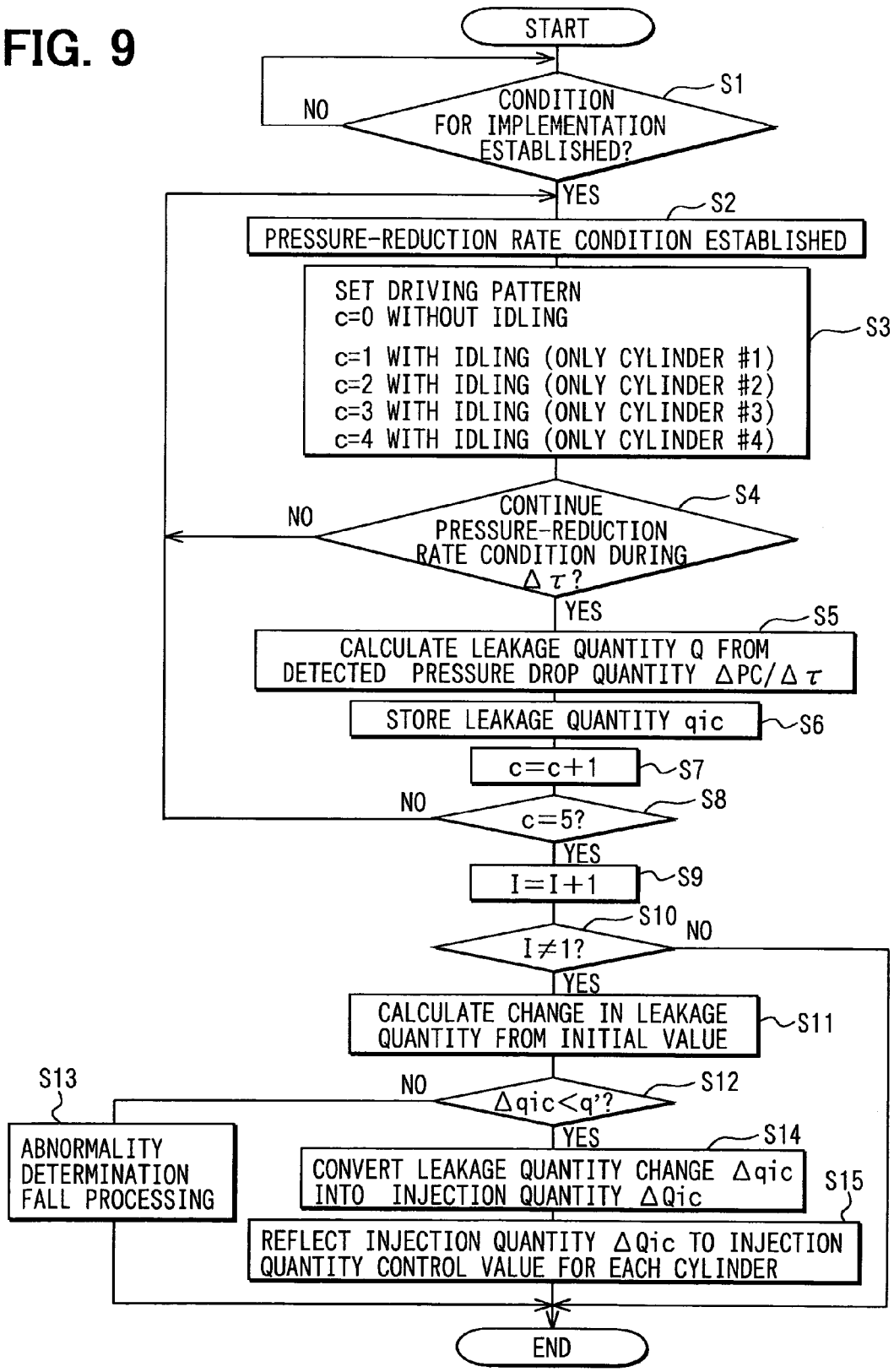
FIG. 9 is a flowchart of a correction control process of the fuel injection system of the present invention related to the injection quantity and based on the change in leakage quantity.

An example of control by the ECU 5 by the technique (2-1) and the principle (3) to (5) described above will be described with reference to a flowchart in FIG. 9.

In the control example, at steps S1 and S2, it is first determined whether or not a learning condition suitable for measuring a leakage quantity in the injector 3 has been established for a current operating state of a vehicle. Specifically, at step S1, after assembly of the injector 3, it is determined if an initial value of the leakage quantity in the injector 3 has not been measured or if a predetermined distance (for example, 5000 km, 10000 km or the like) has been traveled after the previous measurement of the leakage quantity.

If the result of determination at step S1 is NO, the process returns to the start. If the result of determination at step S1 is YES, the process proceeds to step S2 where it is determined whether or not the engine is operating with no injection from the injector 3 (Q<0), the common-rail pressure PC is being reduced where the force-feeding of the fuel from the supply pump 4 is stopped, and the engine 1 is in an operating state (the fuel temperature, the number of engine revolutions and the like) suitable for measuring the leakage quantity.

If the pressure reduction is completed at step S2, the process proceeds to step S3 where driving patterns (a counter value c) of the injector 3 suitable for measuring the leakage quantity in the injector 3 are sequentially set from c=0 to c=4. When the counter value c=0, a driving pattern is such that all the injectors 3 are not idled; when the counter value c=1, a driving pattern is such that only the injector 3 of the first cylinder is continuously idled; when the counter value c=2, a driving pattern is such that only the injector 3 of the second cylinder is continuously idled; when the counter value c=3, a driving pattern is such that only the injector 3 of the third cylinder is continuously idled; and when the counter value c=4, a driving pattern is such that only the injector 3 of the fourth cylinder is continuously idled.

Subsequently, at step S4, after starting the measurement of the common-rail pressure PC based on the driving pattern set at step S3 above, it is determined whether a predetermined period of time (a period of time for detecting a pressure reduction quantity) $\Delta\tau$ has been elapsed or not.

If the result of determination at step S4 is NO, the process returns to step S2. If the result of determination at step S5 is YES, the leakage quantity q corresponding to the pressure drop quantity $\Delta PC/\Delta\tau$ in the common-rail pressure PC within a predetermined period of time is calculated by using a correlation map or a calculating formula at step S5. At step S5, a calculation for obtaining the dynamic leakage quantity qic in the injector 3 for each cylinder from a difference between the leakage quantity q obtained with the counter values c=1 to c=4 and the leakage quantity q obtained with the counter value c=0 is also performed.

Next, at step S6, the dynamic leakage quantity qic calculated at step S5 is stored in the memory.

Next, at step S7, the counter value c is incremented by one so as to switch the driving pattern.

Next, at step S8, the measurement for the driving pattern with the counter value c=4 is terminated so as to determine whether the counter value c has reached 5 or not.

If the result of determination at step S8 is NO, the process returns to step S2. On the other hand, if the result of determination at step S8 is YES, it is determined that the measurement for all the driving patterns is terminated to proceed to the next step S9.

At step S9, 1 is added to the counter value I indicating the number of learning so as to update the counter value I.

Next, at step S10, it is determined whether or not the counter value I indicating the number of learning is not 1. If the result of determination at step S10 is NO (I=1), it is determined that the learning is the first learning so as to store the dynamic leakage quantity qic stored in the memory at step S6 as the initial dynamic leakage quantity q0c (an initial dynamic leakage quantity in each of the first to fourth cylinders), thereby terminating the processing (END).

On the other hand, if the result of determination at step S10 is YES, the initial dynamic leakage quantity q0c for each of the first to fourth cylinders is subtracted from each dynamic leakage quantity qic of each of the first to fourth cylinders stored at step S6 for each cylinder to obtain the leakage quantity change $\Delta$qic of each of the injectors 3 for the respective cylinders ($\Delta$qic=qic−q0c) at step S11.

Next, at step S12, it is determined whether the leakage quantity change $\Delta$qic of each of the injectors 3 for the respective cylinders is smaller than the preset criterion threshold value q' or not.

If the result of determination at step S12 is NO, the abnormality of the injector 3 having the leakage quantity change $\Delta$qic exceeding the criterion threshold value q' is determined at step S13. A vehicle passenger is informed of the occurrence of abnormality in the injector 3 by a display device not shown while fail processing is executed to terminate the process (END).

If the result of determination at step S12 is YES, a correction injection quantity $\Delta$Qic of each of the injectors 3 for the respective cylinders, which is correlated with the leakage quantity change $\Delta$qic of each of the injectors 3 for the respective cylinders, is calculated at step S14 by using a correlation map or a calculating formula so as to store the correction injection quantity $\Delta$Qic of each of the injectors 3 for the respective cylinders in the memory (alternatively, a correction factor may be calculated in place of the correction injection quantity $\Delta$Qic so as to be stored in the memory).

Next, at step S15, control for reflecting the correction injection quantity $\Delta$Qic of each of the injectors 3 for the respective cylinders stored in the memory to a control value of the injection quantity from each of the injectors 3 for the respective cylinders is executed to terminate the processing (END). Step S15 is conducted for each injection from the injector 3. Specifically, the correction is performed in accordance with the leakage quantity change $\Delta$qic for each injection (herein, if the correction factor is stored in place of the correction injection quantity $\Delta$Qic at step S14, the injection quantity is corrected based on the correction factor for each injection).

The common-rail fuel injection system in this Embodiment 1 obtains the dynamic leakage quantity qic in each of the injectors 3 from the pressure drop quantity $\Delta PC/\Delta\tau$ in the common-rail pressure PC detected by the common-rail pressure sensor 24 per unit time at the establishment of the predetermined learning condition. The leakage quantity change $\Delta$qic for each cylinder is obtained from a difference between the dynamic leakage quantity qic for each cylinder and the initial dynamic leakage quantity q0c for each cylinder. Then, the correction injection quantity $\Delta$Qic for each of the injectors 3 is obtained based on the leakage quantity change $\Delta$qic so as to correct the injection quantity from each of the injectors 3 for each injection.

In this manner, the injection quantity from each of the injectors 3 provided for the respective cylinders of the engine 1 is corrected based on its own leakage quantity change $\Delta$qic. As a result, the actual injection quantity from each of the injectors 3 is made equal to the required injection quantity Q in accordance with the actual operating state.

Since the common-rail fuel injection system in this Embodiment 1 determines the abnormality of the injector 3 having the leakage quantity change $\Delta$qic exceeding the preset criterion threshold value q' when the leakage quantity change $\Delta$qic exceeds the criterion threshold value q', it is possible to detect leakage abnormality that the leakage quantity from the injector 3 is excessively increased due to a change with elapse of time and the like. As a result, problems (such as incapability of correcting the injection quantity) caused by leakage abnormality in the injector 3 can be prevented.

In the above-described Embodiment 1, the initial leakage quantity q0 at the first establishment of the predetermined learning condition is used as the basic leakage quantity, and the injection quantity from the injector 3 is corrected in accordance with a difference (the leakage quantity change $\Delta$qic) from the leakage quantity qi at the measurement.

On the other hand, in an Embodiment 2, a median difference between injectors q0' (a design target value) when the injector 3 is new is used as the basic leakage quantity.

As described above, by using the median difference between injectors q0' when the injector 3 is new is used as the basic leakage quantity, the injection quantity can be automatically corrected from a difference (a variation in difference between injectors q0'−q0) between the median difference between injectors q0' of the leakage quantity and the initial leakage quantity q0 at the first establishment of the predetermined learning condition.

Specifically, a variation in leakage quantity between devices can be automatically corrected.

In the above-described Embodiment 1, the initial leakage quantity q0 at the first establishment of the predetermined learning condition is used as the basic leakage quantity, and the injection quantity from the injector 3 is corrected in accordance with a difference (the leakage quantity change Δqic) from the leakage quantity qi at the measurement.

On the other hand, in an Embodiment 3, a previous value leakage quantity q0" obtained at the previous establishment of the predetermined learning condition is used as the basic leakage quantity.

As described above, by using the previous value leakage quantity q0" as the basic leakage quantity, the leakage quantity from the injector 3 can be corrected in accordance with a difference (the leakage quantity change Δqic) between the previous value leakage quantity q0" and the leakage quantity qi at the measurement. Specifically, additional learning control for adding the current correction value (a correction quantity, a correction factor or the like) to the previous correction value (a correction quantity, a correction factor or the like) can be conducted.

Although the example where the dynamic leakage quantity qic in each of the injectors 3 is obtained by using the measurement method described in (2-1) above in the above-described Embodiments, the dynamic leakage quantity qic of each of the injectors 3 may be obtained by using the method described in (2-2) above.

Although the injectors 3 are individually corrected in the above-described Examples, the injection quantity may be corrected based on the same injection correction value in the case where the leakage quantity change Δqic due to wear of each of the injectors 3 is small or in order to reduce a computing load on the ECU 5. In this case, the leakage quantity change may be estimated based on the total static leakage quantity, the total leakage quantity or the total dynamic leakage quantity.

The leakage quantity q is obtained from the pressure drop quantity ΔPC/Δτ so as to obtain the leakage quantity change Δq (specifically, Δqic of the dynamic leak) from a difference between the current leakage quantity qi and the initial leakage quantity q0 in the above Embodiments. However, since the pressure drop quantity ΔPC/Δτ and the leakage quantity q have a correlation, a pressure-reduction rate change X may be obtained from a difference between the current pressure drop quantity ΔPC/Δτ per unit time and the initial pressure drop quantity ΔPC/Δτ per unit time so as to correct the injection quantity based on the pressure-reduction rate change X. As a result, since a load for converting the pressure drop quantity ΔPC/Δτ into the leakage quantity q can be reduced, a calculation load on the ECU 5 can also be reduced.

The injection quantity from the injector 3 is corrected to be increased based on an increase in the leakage quantity (an increase in the leakage quantity change Δq or the pressure-reduction rate change X) in the above Embodiment. However, since the injection timing is likely to delay in accordance with the increase in the leakage quantity, control for accelerating the timing of generation of the injection pulse may be conducted so as not to delay the injection timing with the increase in the leakage quantity. Moreover, since the common-rail pressure decreases with the increase in the leakage quantity in each of the injectors 3, the SCV may be corrected so as to increase the quantity force-fed by the supply pump 4 with the increase in the leakage quantity (the increase in the pressure drop quantity).

What is claimed is:

1. A common-rail fuel injection system for leaking a portion of a high-pressure fuel to a low-pressure side, comprising:
    a common rail for storing the high-pressure fuel;
    an injector for injecting the fuel stored in the common rail;
    a control device for obtaining an injection quantity from the injector in accordance with an operating state so as to control an on-off valve of the injector based on the injection quantity; and
    a common-rail pressure sensor for detecting a common-rail pressure of the fuel stored in the common rail,
    wherein the control device includes correction means for obtaining a pressure drop quantity of the common rail pressure detected by the common-rail pressure sensor per unit time upon establishment of a predetermined learning condition, obtaining a leakage quantity change of the injector from the pressure drop quantity, and correcting the injection quantity injected from the injector for each injection based on the leakage quantity change, and
    wherein the correction means individually obtains the leakage quantity change of each of a plurality of injectors provided for an engine so as to individually correct the injection quantity from each of the injectors based on the leakage quantity change individually obtained for each of the injectors.

2. The common-rail fuel injection system according to claim 1, wherein the correction means obtains a leakage quantity of the injector from the pressure drop quantity so as to obtain the leakage quantity change from a difference between the leakage quantity and a basic leakage quantity.

3. The common-rail fuel injection system according to claim 2, wherein the basic leakage quantity is an initial leakage quantity obtained upon a first establishment of a predetermined learning condition after assembly of the common-rail fuel injection system to a vehicle.

4. The common-rail fuel injection system according to claim 2, wherein the basic leakage quantity is a median difference between injectors when the injector is new.

5. The common-rail fuel injection system according to claim 2, wherein the basic leakage quantity is a previous leakage quantity obtained at previous establishment of the predetermined learning condition.

6. The common-rail fuel injection system according to claim 1, wherein the predetermined learning condition corresponds to a state where an engine to which the common-rail fuel injection system is assembled is in operation, the fuel supply to the common rail is stopped, and the injector does not inject the fuel.

7. The common-rail fuel injection system according to claim 1, wherein the injector includes:
    a control chamber provided with the high-pressure fuel from the common rail through an inlet passage, wherein a pressure in the control chamber is exhausted through an exhaust passage;
    an electrically operable valve for opening and closing the exhaust passage; and
    a nozzle for opening the valve to inject the fuel when the pressure in the control chamber drops to a valve-opening pressure, wherein a leakage quantity in the injector to the low-pressure side consists of a static leakage quantity to the low-pressure side through any of a sliding part and a closed part in the injector while the electrically operable valve closes the exhaust passage and a dynamic leakage quantity from the exhaust passage to the low-pressure side when the electrically operable valve opens the exhaust passage, and the correction means obtains the dynamic leakage quantity for each of the injectors and then obtains a leakage quantity change from a difference between the dynamic leakage quantity for each of the injectors and an initial dynamic leakage quantity for each of the injectors so as to individually correct the injection quantity from each of the injectors based on the leakage quantity change individually obtained for each of the injectors.

8. The common-rail fuel injection system according to claim 7, wherein the correction means measures a non-idling pressure drop quantity in the common-rail pressure detected by the common-rail pressure sensor per unit time in a non-idling state where the respective electrically operable valves of all the injectors are not operated, and measures a single-cylinder additional pressure drop quantity in the common-rail pressure detected by the common-rail pressure sensor per unit time in an idling state where the electrically operable valve of a specific injector is operated so that the nozzle is not opened so as to obtain a dynamic leakage quantity of the specific injector of the injectors from a difference between the non-idling pressure drop quantity and the single-cylinder additional pressure drop quantity.

9. The common-rail fuel injection system according to claim 7, wherein the correction means measures an all-idling pressure drop quantity in the common-rail pressure detected by the common-rail pressure sensor per unit time in an idling state where the respective electrically operable valves of all the injectors are operated so as not to open the nozzle, and measures a single-cylinder subtractive pressure drop quantity in the common-rail pressure detected by the common-rail pressure sensor per unit time in an idling state where only the electrically operable valve of a specific injector is not operated whereas the respective electrically operable valves of the other injectors are operated so as not to open the nozzle, thereby obtaining the dynamic leakage quantity of the specific injector of the injectors from a difference between the all-idling pressure drop quantity and the single-cylinder subtractive pressure drop quantity.

10. The common-rail fuel injection system according to claim 1, wherein the control device includes determination means for determining abnormality of the injector when the leakage quantity change exceeds a preset criterion threshold value.

11. A common-rail fuel injection system for leaking a part of a high-pressure fuel supplied to a low-pressure side, comprising:

a common rail for storing the high-pressure fuel;

an injector for injecting the fuel stored in the common rail;

a control device for obtaining an injection quantity from the injector in accordance with an operating state so as to control an ON-OFF valve of the injector based on the injection quantity; and a common-rail pressure sensor for detecting a common-rail pressure of the fuel stored in the common rail, wherein the control device includes correction means for obtaining a pressure drop quantity in the common rail pressure detected by the common-rail pressure sensor per unit time at establishment of a predetermined learning condition, obtaining a pressure-reduction rate change from the pressure drop quantity, and correcting the injection quantity injected from the injector for each injection based on the obtained pressure-reduction rate change, and wherein the correction means individually obtains the leakage quantity change of each of a plurality of injectors provided for an engine so as to individually correct the injection quantity from each of the injectors based on the leakage quantity change individually obtained for each of the injectors.

* * * * *